United States Patent Office

3,493,597
Patented Feb. 3, 1970

3,493,597
PURIFICATION OF AQUEOUS QUATERNARY AMMONIUM SALT SOLUTIONS
Charles R. Campbell and Robert Johnson, Pensacola, Fla., Darrell M. Jones, Decatur, Ala., and Jim N. Maloney, Jr., Pensacola, Fla., assignors to Monsanto Company, St. Louis, Mo., a corporation of Delaware
No Drawing. Continuation-in-part of application Ser. No. 460,823, June 2, 1965. This application May 25, 1967, Ser. No. 641,156
Int. Cl. C07c *141/00, 141/02, 143/00*
U.S. Cl. 260—459                                12 Claims

ABSTRACT OF THE DISCLOSURE

This invention relates to the removal of impurities that include a heavy metal from an acrylonitrile electrohydrodimerization catholyte containing a quaternary ammonium salt by precipitation of the impurities from an aqueous solution of the quaternary ammonium salt.

Cross-references to other applications

This application is a continuation-in-part of our copending application, Ser. No. 460,823, filed June 2, 1965 and now abandoned.

Background of the invention

It is known that adiponitrile can be prepared in commercially attractive yields by the electrohydrodimerization of acrylonitrile. In general, the hydrodimerization reaction is carried out in an electrolytic cell having an anode chamber and cathode chamber separated by a cation permeable membrane. A dilute aqueous solution of sulfuric acid is continuously circulated through the anode chamber as an anolyte. Acrylonitrile is dissolved in an aqueous solution of a quaternary ammonium salt. This solution is employed as the catholyte and is continuously circulated through the cathode chamber.

The salt employed in the catholyte should be an adequate conductor of electrical current for use in the electrodimerization process. It is also desirably hydrotropic, i.e., it should increase the solubility of the acrylonitrile in water. Quaternary ammonium salts are highly suitable for such purposes, and particularly good results have been obtained by the use of tetraalkylammonium sulfates, alkyl sulfates, aryl sulfonates and alkaryl sulfonates in which the alkyl groups each preferably contain from one to four carbon atoms. Tetraethylammonium sulfate, tetraethylammonium ethyl sulfate, tetramethylammonium toluene sulfonate, tetraethylammonium benzene sulfonate, triethylmethylammonium benzene sulfonate and triethylmethylammonium toluene sulfonate are especially well suited for use in the dimerization process.

In operation, an electrical potential is established between the anode and the cathode of the dimerization cell to provide a unidirectional flow of current. Under the influence of such current, acrylonitrile is reductively dimerized to adiponitrile at the cathode. Although it can be conducted as a batch operation, the dimerization process is typically carried out in a continuous manner with recirculation of the catholyte, and a substantial proportion of the reaction products including adiponitrile are thereby also recirculated through the cathode chamber. The operating pH of the catholyte, which may be as high as about 12, is normally at least about 2 and preferably between about 3 and about 10. The catholyte temperature is usually maintained between about 40° and 60° C. Based on the weight of the quaternary ammonium salt and water, the salt concentration in the catholyte is generally between 45 and 65 weight percent.

Adiponitrile is generally recovered by withdrawing a portion of the circulating catholyte, diluting it with water and then extracting it with acrylonitrile to remove a variety of reaction products which normally include propionitrile, bis-cyanoethylether, hydroxypropionitrile, and a small amount of higher-boiling byproducts together with the adiponitrile product. The organic (acrylonitrile) phase containing the reaction products is generally water-washed to remove dissolved quaternary ammonium salt, and the aqueous salt solution thus obtained is normally passed to an evaporator for reduction of its water and acrylonitrile concentrations. The resulting concentrated salt solution is then customarily recombined with the circulating stream of catholyte. The pH of the salt solution in the evaporator is generally about the same as that of the catholyte, i.e., in most cases between about 2 and about 12 and most frequently between about 3 and about 10. The evaporation is usually carried out at a temperature not greater than about 115° C. (preferably at least about 80° C.) and until the salt concentration is adjusted to at least about 25%, and preferably between about 45% and about 85% by weight of the solution in the evaporator.

By use of the aforedescribed recovery process, a given quantity of a quaternary ammonium salt can be reused many times in the electrodimerization catholyte. When efficiently carried out, the acrylonitrile extraction of the diluted catholyte and subsequent water-washing of the resulting organic phase provide a product stream which, as fed to a distillation train for adiponitrile recovery, is substantially free from quaternary ammonium salt, and the concentrated salt solution obtained by the foregoing evaporation technique is substantially free from the organic electrodimerization products. However, there are normally other more polar compounds in the catholyte which tend to accumulate in the aqueous phase produced by the acrylonitrile extraction. For example, metal salts are produced by corrosion of the materials of construction of the electrolytic cell, process piping, etc. Small amounts of metal salts are also introduced into the catholyte as impurities in the water and starting materials for the dimerization reaction. Because of their polar nature, these metals tend to accumulate in the aqueous solution of quaternary ammonium salt. After successive recycles of the salt solution, the concentration of metals tends to become undesirably high and may result in plating of such metals on the cathode. Analysis of the undesirable material that collects on the cathode has revealed that it included various heavy metals, i.e., metals having an atomic weight greater than about 50 and, in particular, heavy metals of the types in Groups I-B, II-B, IV-B, VI-A, VII-A and VIII of the Periodic Table of the Elements. More specific examples of such metals include nickel, chromium, lead, silver, zinc, manganese, copper, aluminum and thallium. By accumulating on the cathode surface, such metals can substantially reduce the efficiency of adiponitrile production by the cell and, in fact, a heavy metal ion concentration in the catholyte as low as 0.5 to 10 parts per million, based on the quaternary ammonium salt solution, can significantly reduce the adiponitrile yield. Accordingly, a process by which such heavy metal impurities can be simply and economically removed from the aqueous ammonium salt solution employed as the dimerization catholyte is very desirable, and it is an object of this invention to provide such a process.

Summary of the invention

In general, this invention provides a process for removing impurities including a heavy metal from an aqueous quaternary ammonium salt solution employed as an acrylonitrile electrohydrodimerization catholyte which comprises substantially increasing the pH of said aqueous solution to a value greater than 7, adjusting the salt concentration of said aqueous solution to at least about 25%, heating said aqueous solution at a temperature not greater than about 115° C. until substantial precipitation takes place, and separating the resulting precipitate from said aqueous solution. In a more specific embodiment, the invention provides a process for purifying an aqueous acrylonitrile electrodimerization catholyte containing a quaternary ammonium salt and a heavy metal impurity which comprises separating an aqueous solution of the quaternary ammonium salt from said catholyte, increasing the pH of said aqueous solution to a value greater than 7 and substantially greater than the pH of said catholyte, adjusting the salt concentration of said aqueous solution to at least about 25%, heating said aqueous solution at a temperature not greater than about 115° C. until a substantial proportion of the heavy metal impurity is precipitated, and separating the resulting precipitate from said aqueous solution.

Detailed description of the invention

The process of this invention is significantly superior to the alternative technique of precitating heavy metal impurities from the catholyte prior to separation of the aqueous quaternary ammonium salt solution, principally because adiponitrile and dimerization byproducts which may be present before the separation tend to hydrolyze and thereby produce undesirable carboxylic acid salts. Accordingly, the present process is especially advantageously employed after substantial separation of the aqueous salt solution from the adiponitrile and reaction byproducts that are normally present in admixture with the catholyte.

Other alternative procedures for maintaining a low level of heavy metal impurities in the dimerization catholyte have likewise been found to be impractical. For example, operation of the electrodimerization process at an abnormally high pH would provide conditions similar to those of the present process for precipitation of such metals. However, that approach to heavy metal impurities level control also has the aforementioned disadvantage of causing undesirable hydrolysis of the adiponitrile and dimerization byproducts.

As aforesaid, the process of this invention comprises substantially increasing the pH of the aqueous quaternary ammonium salt solution to a value greater than 7 prior to precipitation of impurities from the solution. Thus, after separation from the dimerization catholyte, the salt solution must be made alkaline as well as raising its pH to a value substantially higher than the pH of the catholyte. Although some precipitation may result from a pH increase as small as 0.5, the process is preferably carried out with a pH increase of at least 2. However, the smallest increase in pH that is adequate for proper precipitation of the heavy metal impurity is preferred in order to minimize the amount of base required for the pH increase and the pH readjustment necessary to return the pH of the purified solution to the value desired for its reuse in the dimerization catholyte.

The salt concentration of the resulting alkaline solution is adjusted to at least about 25%, and most advantageously to between about 45% and about 85%, by any convenient technique, the most suitable of which is evaporative distillation. Preferably, the salt solution is maintained at an elevated temperature until the concentration and precipitation steps are completed, and preferably at a temperature of at least 80° C. during the precipitation step. The length of time for which the concentrated solution should be maintained at an elevated temperature can be any period adequate for precipitation of the amount of impurities desirably removed from the solution. In general, a period of at least about one hour and most frequently between about one hour and four hours at a temperature not greater than 115° C. will give best results. Thereafter, the precipitated impurities can be separated from the resulting purified solution by any convenient liquid-solid separation method such as filtration, centrifuging, decantation, etc.

In a specific embodiment of the process, a portion of the quaternary ammonium salt solution is withdrawn from the dimerization catholyte, purified in accordance with this invention, and then recombined with the catholyte. However, it is also feasible to shut down the dimerization process, e.g. when the yield of adiponitrile has fallen to an undesirable level, and then purify all of the salt solution in the catholyte before resuming operation of the dimerization process.

The following examples are included to illustrate the process of this invention and are not representative of any limitations on the manner in which the process can be carried out.

EXAMPLE 1

A tetramethylammonium toluene sulfonate solution that had been recycled about 20 times through the cathode chamber of an acrylonitrile electrohydrodimerization cell was extracted with acrylonitrile. The pH of the solution was then adjusted to 14 with tetramethylammonium hydroxide. The aqueous solution was concentrated to 70 percent and then heated for one hour at 112–114° C. The precipitate thus formed was filtered from the solution. Thereafter, the pH of the solution was readjusted to 8.7 and the solution was diluted to a salt concentration of about 60 weight percent. The purified aqueous solution was then reused as the catholyte in the same cell for 12 days. Table I sets forth the average analyses of the products obtained with the impure and purified salt solutions. All percentages are given as weight percent based on the total product.

TABLE I

| Reaction product | Catholyte containing impure solution | Catholyte containing purified solution |
| --- | --- | --- |
| Adiponitrile, percent | 80.0 | 85.7 |
| Propionitrile, percent | 13.3 | 6.9 |
| Hydroxypropionitrile, percent | 4.6 | 5.6 |
| Bis-cyanoethylether, percent | 2.0 | 1.7 |
| High-boiling products, percent | 0.1 | 0.1 |

EXAMPLE 2

In an electrolytic cell through which an aqueous catholyte containing tetramethylammonium toluene sulfonate had been recirculated many times at a pH of 8.4, the yield of adiponitrile obtained by electro-hydrodimerizing acrylonitrile was 80 weight percent. Acrylonitrile, adiponitrile, propionitrile, and other reaction byproducts were extracted from the aqueous solution, which was then concentrated from 41.8 weight percent to 60 weight percent. The concentrated solution was made alkaline with tetramethylammonium hydroxide to adjust its pH to about 14 and then heated until a precipitate appeared. The precipitate was filtered from the solution, and the filtrate was diluted to a salt concentration of 39.1 weight percent. The purified aqueous solution was then reused at a pH of 8.7 for about 12 days as the catholyte in the same electrohydro-dimerization cell. Table II sets forth the results obtained with the impure salt solution and with the same solution after it had been purified in accordance with the process of this invention.

TABLE II

| Catholyte composition | Catholyte containing impure solution | Catholyte containing purified solution |
| --- | --- | --- |
| Tetramethylammonium toluene sulfonate, percent | 41.8 | 39.1 |
| Acrylonitrile, percent | 15.4 | 16.2 |
| Water, percent | 29.7 | 27.9 |
| Reaction byproducts, percent | 13.2 | 15.6 |
| Reaction Yield: | | |
| Adiponitrile, percent | 80.0 | 86.1 |
| Propionitrile, percent | 13.3 | 6.9 |
| Bis-cyanoethylether, percent | 2.0 | 1.7 |
| High-boiling products, percent | 4.7 | 5.3 |

Although the process of this invention has been described in specific embodiments, it will be appreciated by those skilled in the art that many modifications and variations thereof may be employed without departing from the spirit and scope of the invention. Accordingly, it should be understood that the invention is not limited to the embodiments described herein except as it is defined in the appended claims.

We claim:

1. A process for removing impurities including a heavy metal from an aqueous quaternary ammonium salt solution employed as an acrylonitrile electrohydrodimerization catholyte which comprises substantially increasing the pH of said aqueous solution to a value greater than 7, adjusting the salt concentration of said aqueous solution to at least about 25%, heating said aqueous solution at a temperature not greater than about 115° C. until substantial precipitation takes place, and separating the resulting precipitate from said aqueous solution.

2. A process as defined in claim 1, in which the quaternary ammonium salt is a tetra($C_1$–$C_4$)alklammonium salt.

3. A process as defined in claim 1, in which the quaternary ammonium salt is tetraethylammonium sulfate, tetraethylammonium ethyl sulfate, tetramethylammonium toluene sulfonate, tetraethylammonium benezene sulfonate, triethylmethylammonium benzene sulfonate or triethylmethylammonium toluene sulfonate.

4. A process as defined in claim 1, in which the heavy metal is nickel, lead, copper, chromium, zinc, manganese, aluminum, thallium or silver.

5. A process as defined in claim 1, in which the pH of said aqueous solution is increased by at least 2.

6. A process as defined in claim 1, in which the salt concentration of said aqueous solution is adjusted to between about 45% and about 85%.

7. A process as defined in claim 1, in which said temperature is at least about 80° C.

8. A process as defined in claim 1, in which said aqueous solution is heated at said temperature for between about 1 hour and about 4 hours.

9. A process for purifying an aqueous acrylonitrile electrodimerization catholyte containing a quaternary ammonium salt and a heavy metal impurity which comprises separating an aqueous solution of the quaternary ammonium salt from said catholyte, increasing the pH of said aqueous solution to a value greater than 7 and substantially greater than the pH of said catholyte, adjusting the salt concentration of said aqueous solution to at least about 25%, heating said aqueous solution at a temperature not greater than about 115° C. until a substantial proportion of the heavy metal impurity is precipitated, and separating the resulting precipitate from said aqueous solution.

10. A process as defined in claim 9, in which the pH of said catholyte is between about 2 and about 12.

11. A process as defined in claim 9, in which the quaternary ammonium salt is hydrotropic.

12. A process as defined in claim 9, which further comprises recombining the resulting purified aqueous solution with said catholyte.

References Cited

UNITED STATES PATENTS

| | | | |
|---|---|---|---|
| 3,227,748 | 1/1966 | Bragdon et al. | 260—501.15 |
| 3,267,131 | 8/1966 | Campbell et al. | 260—465.8 |
| 3,335,162 | 8/1967 | Campbell et al. | 260—459 |

JOHN H. MACK, Primary Examiner

H. M. FLOURNOY, Assistant Examiner

U.S. Cl. X.R.

204—73; 260—501.15; 260—567.6